United States Patent [19]

Matsuo et al.

[11] Patent Number: 6,107,594
[45] Date of Patent: Aug. 22, 2000

[54] FLASH BUTT WELDING DEVICE

[75] Inventors: Giichi Matsuo; Susumu Okawa, both of Yokohama; Hiroshi Fujii, Chigasaki, all of Japan

[73] Assignee: NKK Corporation, Tokyo, Japan

[21] Appl. No.: 09/194,846

[22] PCT Filed: Apr. 8, 1998

[86] PCT No.: PCT/JP98/01612

§ 371 Date: Dec. 4, 1998

§ 102(e) Date: Dec. 4, 1998

[87] PCT Pub. No.: WO98/46390

PCT Pub. Date: Oct. 22, 1998

[30] Foreign Application Priority Data

Apr. 16, 1997 [JP] Japan ................................. 9-099008

[51] Int. Cl.[7] ............................................. B23K 9/00
[52] U.S. Cl. .......................................... 219/97; 219/100
[58] Field of Search ............................. 219/97, 100, 101, 219/103, 104

[56] References Cited

U.S. PATENT DOCUMENTS

| | | | |
|---|---|---|---|
| 4,686,346 | 8/1987 | Kuchuk-Yatsenko | 219/101 |
| 4,725,707 | 2/1988 | Kuchuk-Yatsenko et al. | 219/100 |
| 4,733,044 | 3/1988 | Kuchuk-Yatsenko et al. | 219/100 |
| 4,940,876 | 7/1990 | Kuchuk-Yatsenko | 219/100 |
| 5,117,084 | 5/1992 | Kuchuk-Yatsenko et al. | 219/100 |
| 5,389,760 | 2/1995 | Zollinger | 219/97 |

FOREIGN PATENT DOCUMENTS

| | | |
|---|---|---|
| 56-126987 | 9/1981 | Japan . |
| 9-94671 | 4/1997 | Japan . |

Primary Examiner—Patrick Ryan
Assistant Examiner—Anjan Dey
Attorney, Agent, or Firm—Frishauf, Holtz, Goodman, Langer & Chick, P.C.

[57] ABSTRACT

A flash-butt welder having a stationary head 41 and a moving head 42, a pair of electrodes 45a, 45b, and 46a, 46b arranged to each of the stationary and moving heads, respectively, wherein power source transformers 12 through 16 are located at the stationary head 41 side, four bus bars 21 through 24 connecting the power source transformers 12 through 16 with the electrodes 45a, 45, 46a, and 46b are arranged at symmetrical positions surrounding a billet 10, while the bus bars, 22 and 24 as half of the number are connected to the electrodes 46a and 46b at the moving head 42 side.

2 Claims, 10 Drawing Sheets

EXPERIMENTAL MODEL FOR POWER APPLICATION
(THE NUMBER OF CIRCUITS =1 )

FIG. 4

EXPERIMENTAL MODEL FOR POWER APPLICATION
(THE NUMBER OF CIRCUITS =2 )

FIG. 5

EXPERIMENTAL MODEL FOR POWER APPLICATION
(THE NUMBER OF CIRCUITS =4 )

FLASH BUTT WELDING DEVICE

TECHNICAL FIELD

The present invention relates to a flash-butt welder, and particularly to an arrangement of the power source transformers and the conductors thereof.

BACKGROUND ART

Figure 11:
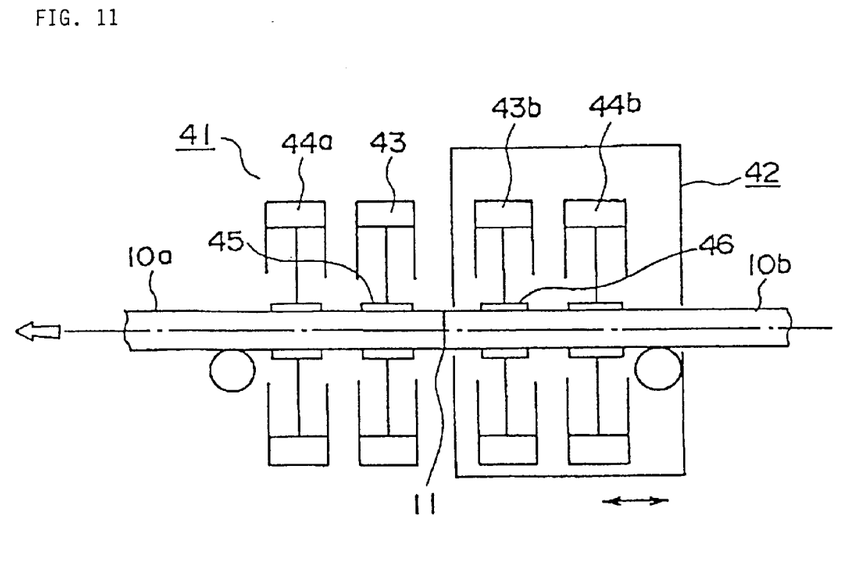
FIG. 11 illustrates a conventional flash-butt welder.

FIG. 11 shows outline of a flash-butt welder. The flash-butt welder is provided with a stationary head 41 and a moving head 42. Each of the heads has hydraulic cylinders 43a, 44a, and 43b, 44b, to clamp a preceding billet 10a and a succeeding billet 10b, respectively. Of these hydraulic cylinders, the clamp bodies of the cylinder 43a and of the cylinder 43b which are near to an edge 11 of the billets form electrodes 45, 46, respectively. The moving head 42 is movable, and the movement thereof is controlled by a plurality of upset hydraulic cylinders (not shown).

Figure 12:
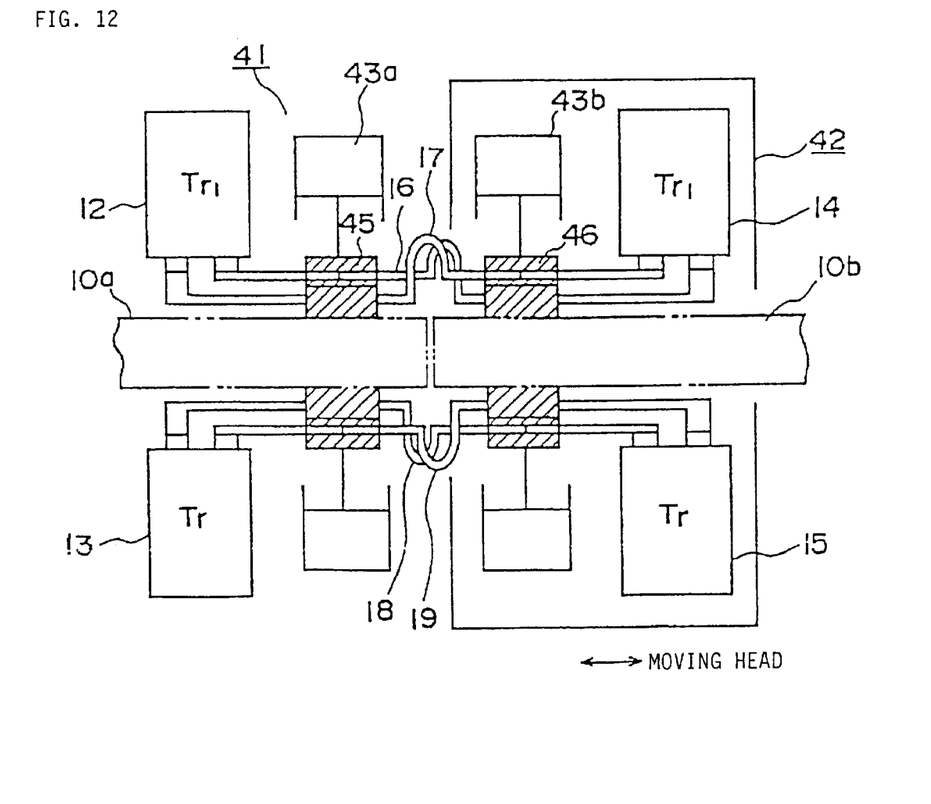
FIG. 12 illustrates the relative arrangement of the power source transformers and the conductors (bus bars) in the flash-butt welder of FIG. 11.

FIG. 12 illustrates the arrangement of the power source transformers and the conductors (bus bars) in the flash-butt welder shown in FIG. 11. The stationary head 41 is equipped with two power source transformers 12, 13, and the moving head 42 is also equipped with two power source transformers 14, 15. Each of the four bus bars, 16 through 19, connects a transformer of the stationary head 41 side with the corresponding transformer of the moving head 42 side.

A flash-butt welder for welding billets or the like uses a power source with low voltage and large current (for example, 10 Volt and 100 thousand Ampere) owing to the inherent characteristics of the welder. Consequently, the welder requires at least four transformers, 12 through 15, and furthermore, each two power source transformers are provided to each of the stationary head 41 side and the moving head 42 side, as shown in FIG. 12. As a result, the necessary number of bus bars connecting the stationary head 41 side with the moving head 42 side is at least four. This requirement makes the structure of the welder complex, and these bus bars causes a high impedance. The high impedance makes a low efficiency. Since the welder is driven under a condition of low voltage and large current, the effect of the high impedance is extremely significant.

DISCLOSURE OF INVENTION

The present invention aims to solve the above-described problems, and an object of the present invention is to provide a flash-butt welder that decreases the number of bus bars connecting the stationary head side with the moving head side and that decreases the impedance of these bus bars. The present invention as a preferred mode is following.

The first flash-butt welder comprising: at least two power source transformer located at the stationary head side; at least two conductors arranged symmetrically to a central line of works to be welded and connecting the power transformers with electrodes; while half of the number of the conductors are connected to the electrodes at the moving head side.

The second flash-butt welder is one that the conductors are arranged to minimize an area surrounded by the conductors and the works to be welded in the first welder.

DESCRIPTION OF THE PREFERRED EMBODIMENT

Figure 1:
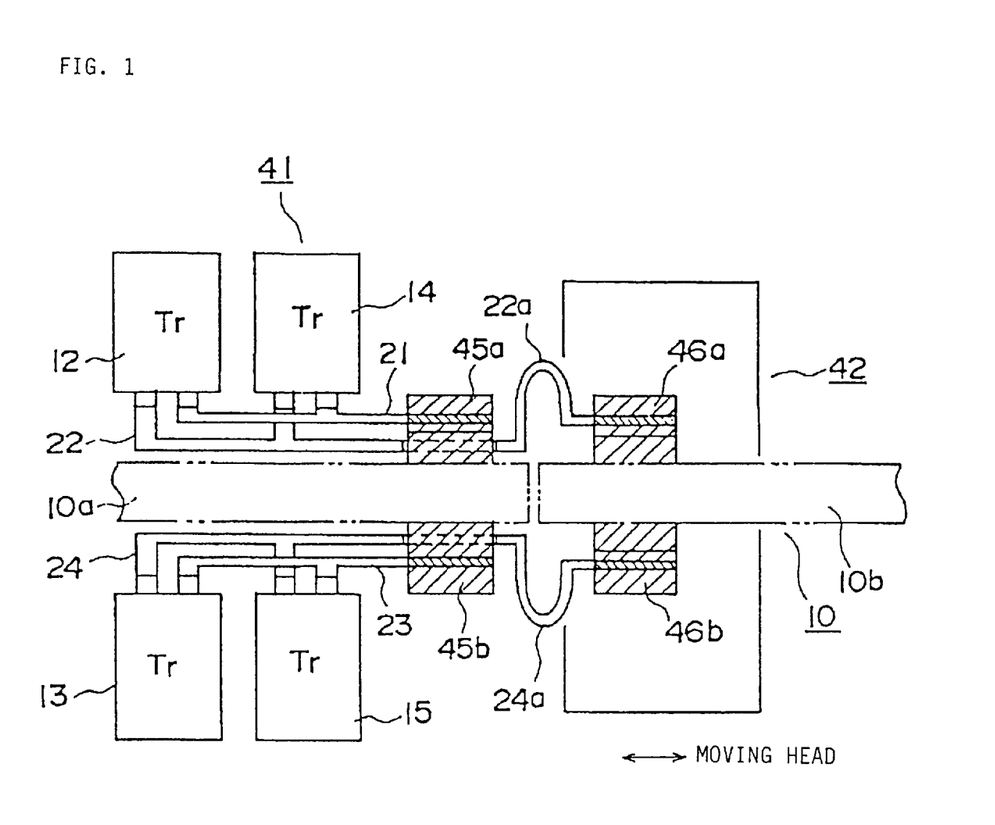
FIG. 1 illustrates a flash-butt welder of a mode to carry out the present invention.

FIG. 1 illustrates an example of a flash-butt welder according to the present invention. The welder is provided with four power source transformers, 12 through 15, at the stationary head 41 side, and, in this example, the power source transformers, 12 and 14, are electrically connected in parallel to each other, and the transformers, 13 and 15, are electrically connected in parallel to each other. That is, one terminal of each of the transformer 12 and the transformer 14 is connected to the bus bar 21, which is then connected to the electrode 45a of the billet 10a side. The other terminal of each of the transformer 12 and the transformer 14 is connected to the bus bar 22, which is then connected to the electrode 46a on the billet 10b side via a curved jumping section 22a. Similar connection is established between the power source transformers 13, 15. A terminal of each of the transformer 13 and the transformer 15 is connected to the bus bar 23, which is then connected to the electrode 45b on the billet 10a side. The other terminal of each of the transformer 13 and the transformer 15 is connected to the bus bar 24, which bus bar 24 is then connected to the electrode 46b on the billet 10b side via a curved jumping section 24a. The bus bars, 21 through 24, are arranged at symmetrical positions surrounding the billet 10. That is, the bus bars, 21 through 24, are placed at equal intervals along a concentric circle around the billet 10.

According to the mode shown in FIG. 1, the transformers, 12 through 15, are installed at the stationary head 41 side, and the power source transformers 12 and 14, 13 and 15, which are connected to the corresponding electrodes 45a, 45b, 46a, and 46b are connected in parallel, respectively. Thus, the number of bus bars 22, 24, which consist of flexible conductors connecting between the stationary head 41 side and the moving head 42 side is two, which number is half of the conventional one. In addition, by placing four bus bars 21 through 24, in symmetrical positions surrounding the billet 10, the total impedance decreases. The reduction of the impedance is explained by the following-described theory.

Regarding the magnetic flux density (corresponding to mutual inductance) $B_n$ at a point of distance x from the center of billet, assume the magnetic flux density as A at the number of conductors n=1, then:

$$n = 1 \quad B_1 = A$$
$$n = 2 \quad B_2 = A \times 2x/(d + x),$$

where $d$ is the distance between the billet and the conductor $$n = 4 \quad B_4 = A \times 4x^3/(d^3 + xd^2 + x^2d + d^3)$$
$$= \{A \times 2x/(d + x)\} \times 2x^2/(d^2 + x^2)$$
$$= B_2 \times 2x^2/(d^2 + x^2)$$

Figure 2:
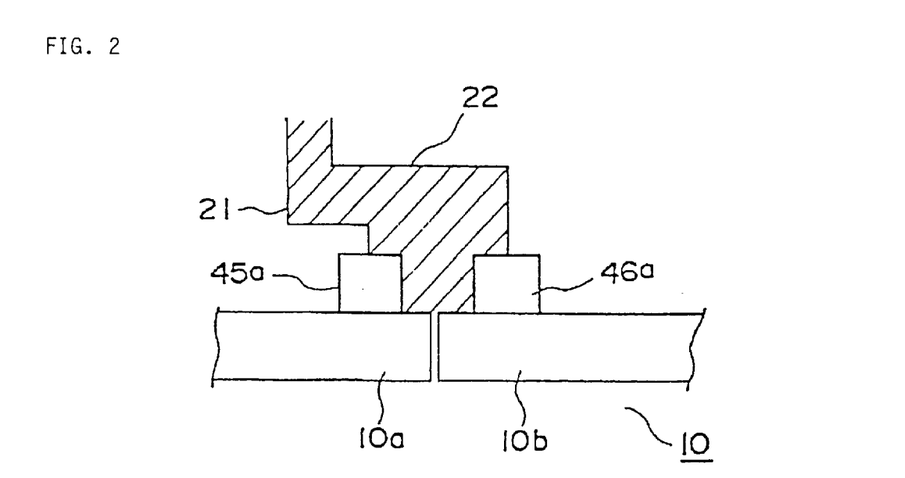
FIG. 2 illustrates the area surrounded by electrodes and a conductor in FIG. 1.

The correlation shows that the increase in the value of n (the number of conductors) decreases the magnetic flux density. Since inductance L is proportional to the magnetic flux density, increase in n decreases the inductance L. As shown in FIG. 2, when the bus bar is placed to decrease the area S which is surrounded by the bus bars 21, 22 and the billet 10, the interlinkage-magnetic flux decreases, thus the inductance L can be low.

Figure 3:
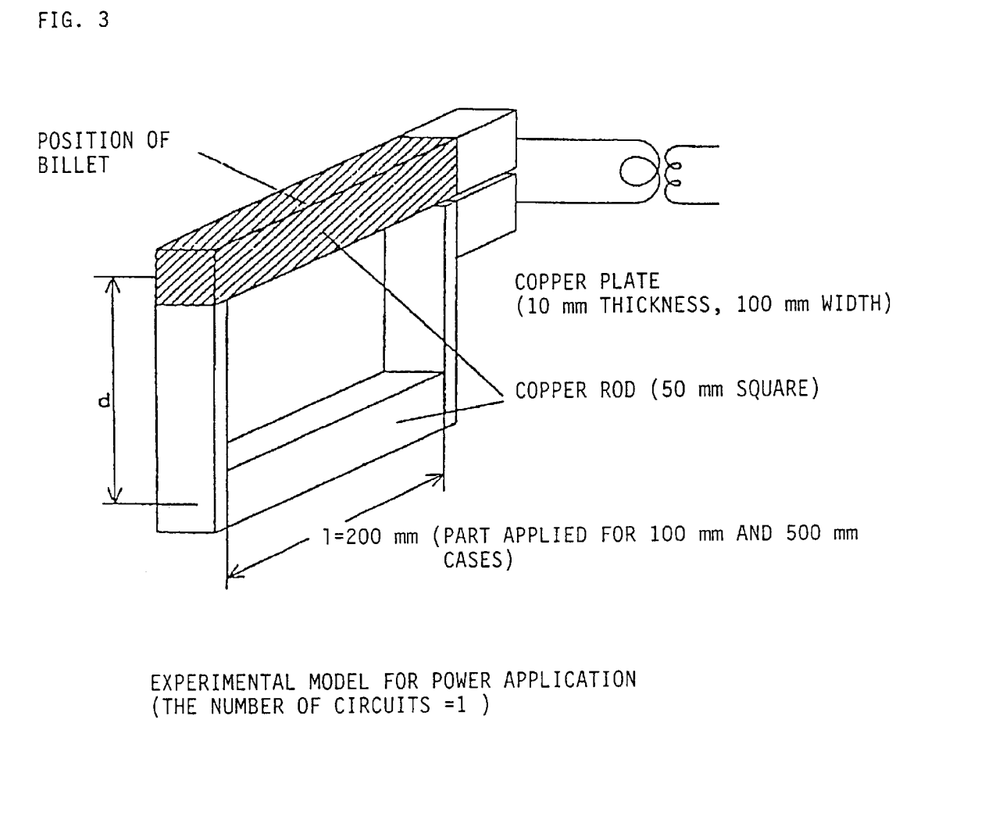
FIG. 3 shows a perspective view of an experimental model for power application to validate the usefulness of a mode to carry out the present invention, (for the case of the number of circuits=1).
Figure 4:
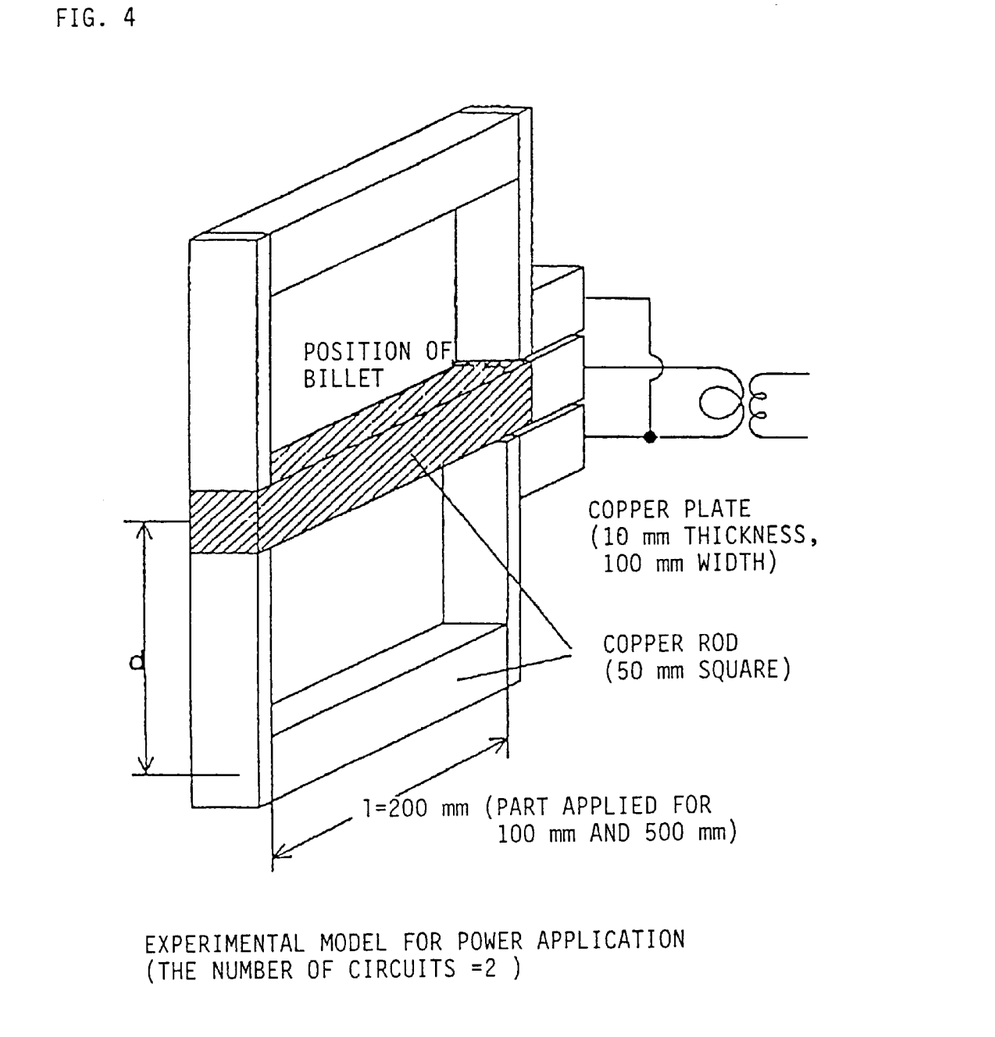
FIG. 4 shows a perspective view of an experimental model for power application to validate the usefulness of a mode to carry out the present invention, (for the case of the number of circuits=2).
Figure 5:
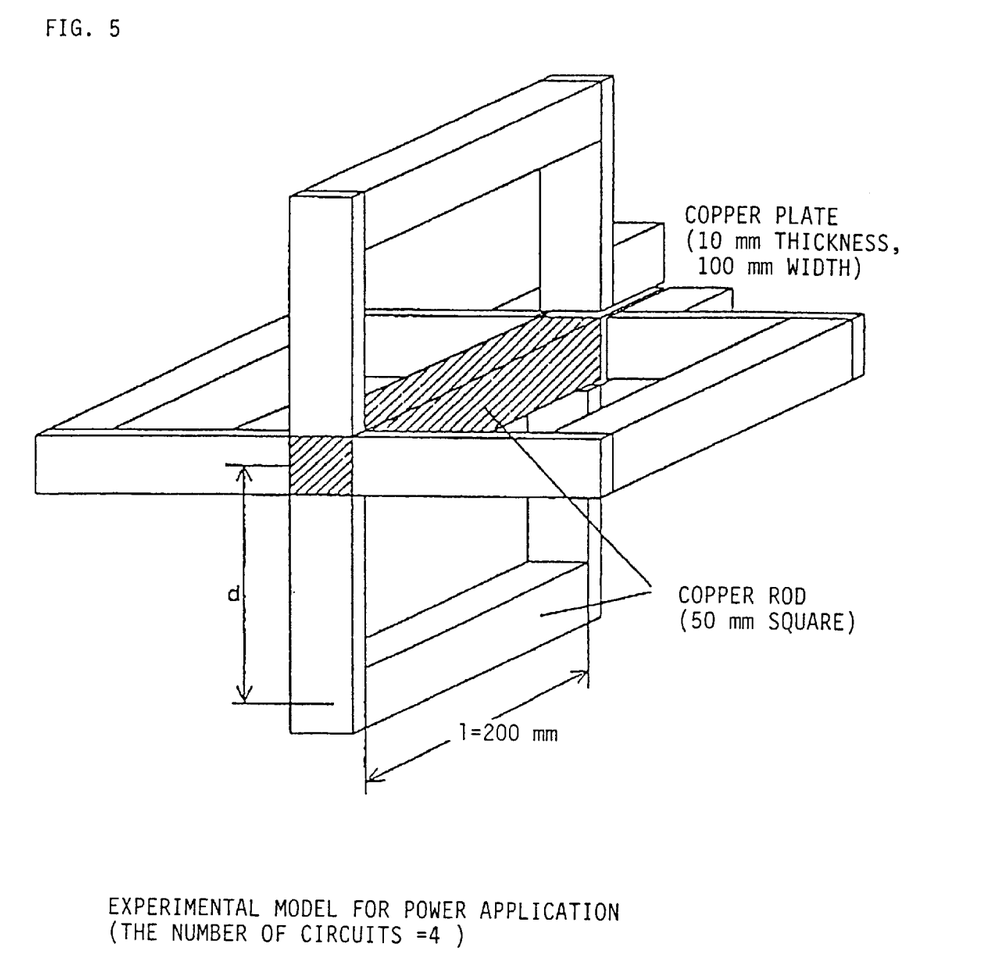
FIG. 5 shows a perspective view of an experimental model for power application to validate the usefulness of a mode to carry out the present invention, (for the case of the number of circuits=4).
Figure 6:
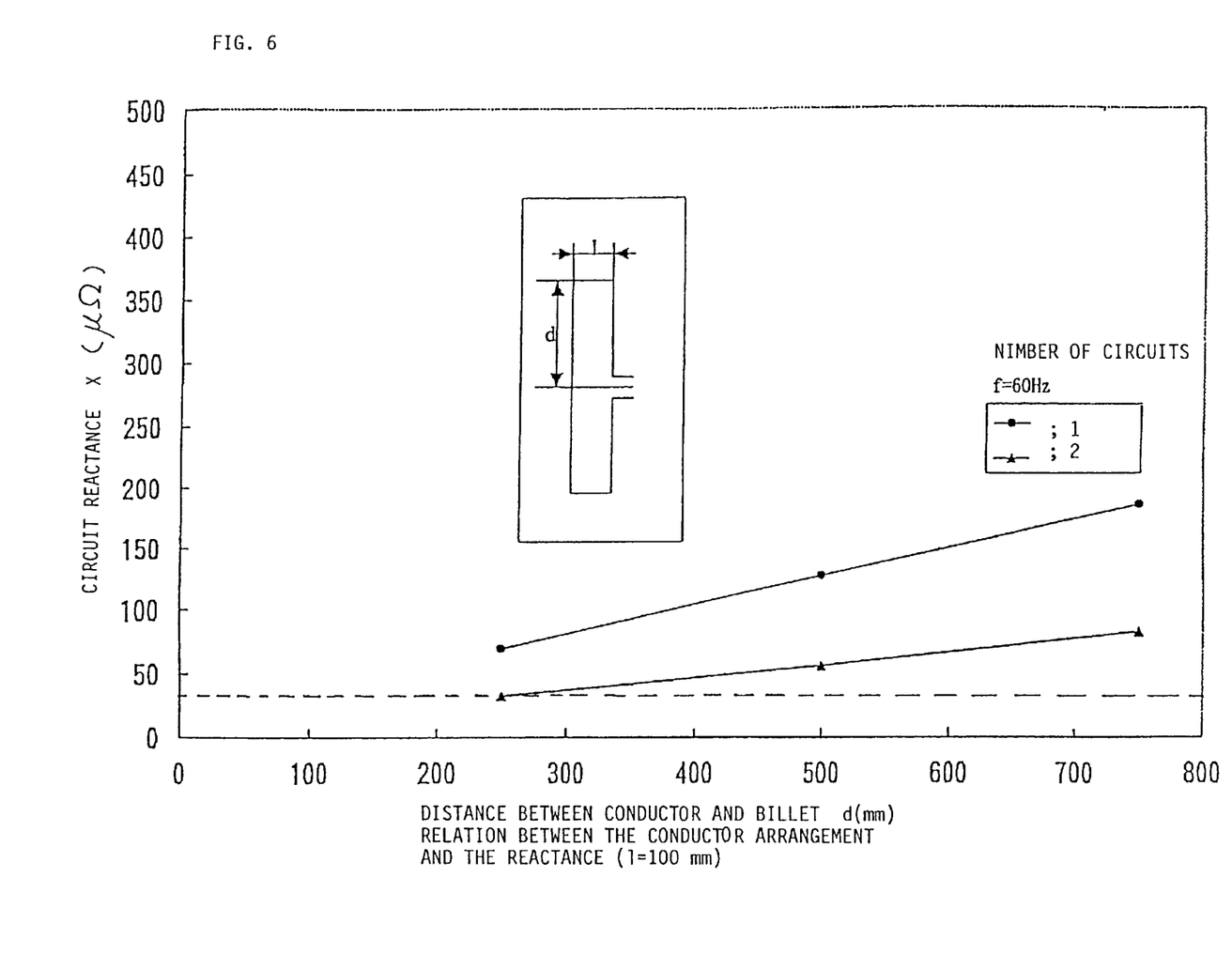
FIG. 6 shows characteristic curves in relation to the conductor arrangement and the reactance in the experimental models of FIG. 3 and FIG. 4, (1=100 mm).
Figure 7:
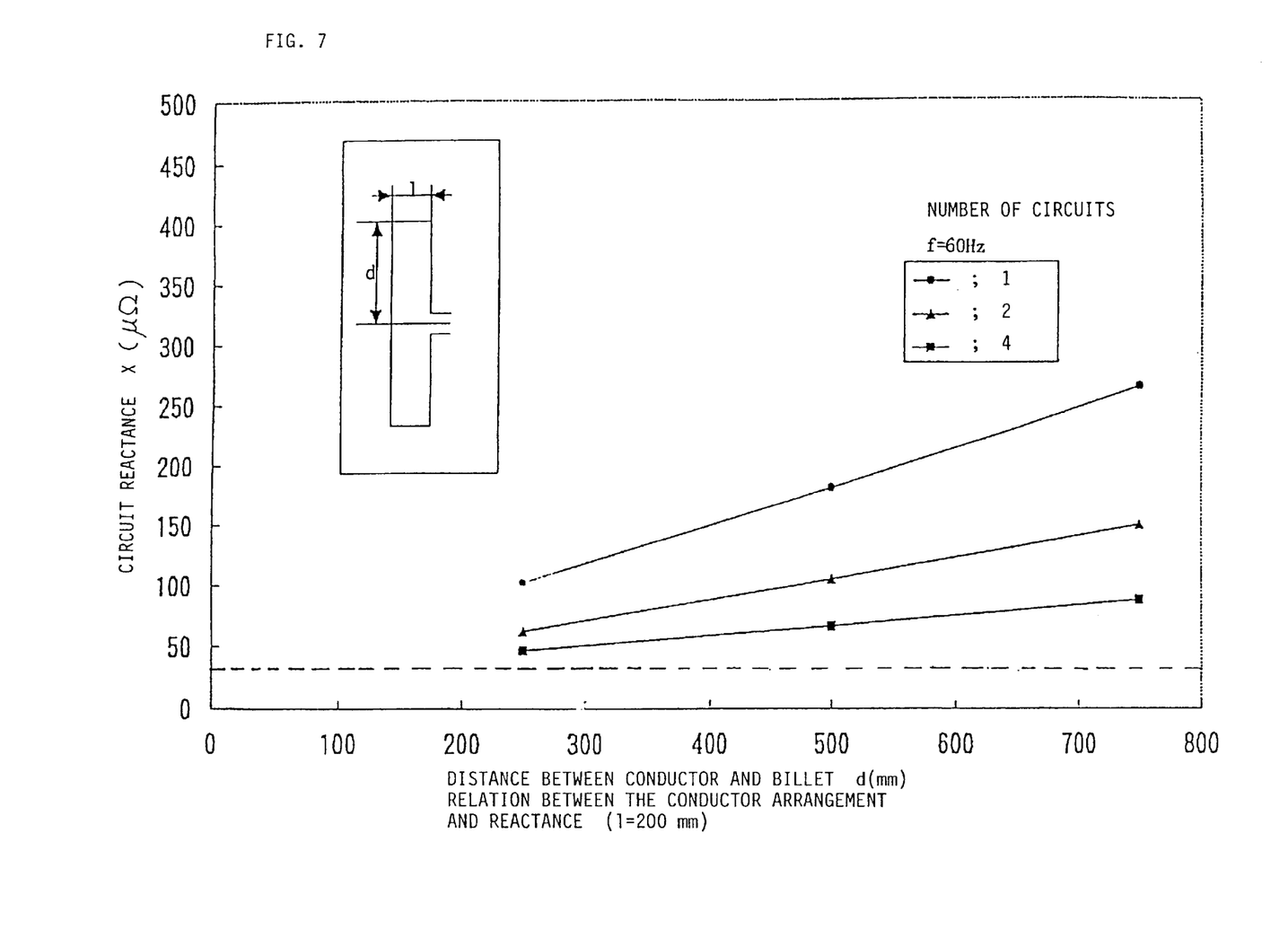
FIG. 7 shows characteristic curves in relation to the conductor arrangement and the reactance in the experimental models of FIGS. 3, 4 and 5, (1=200 mm).
Figure 8:
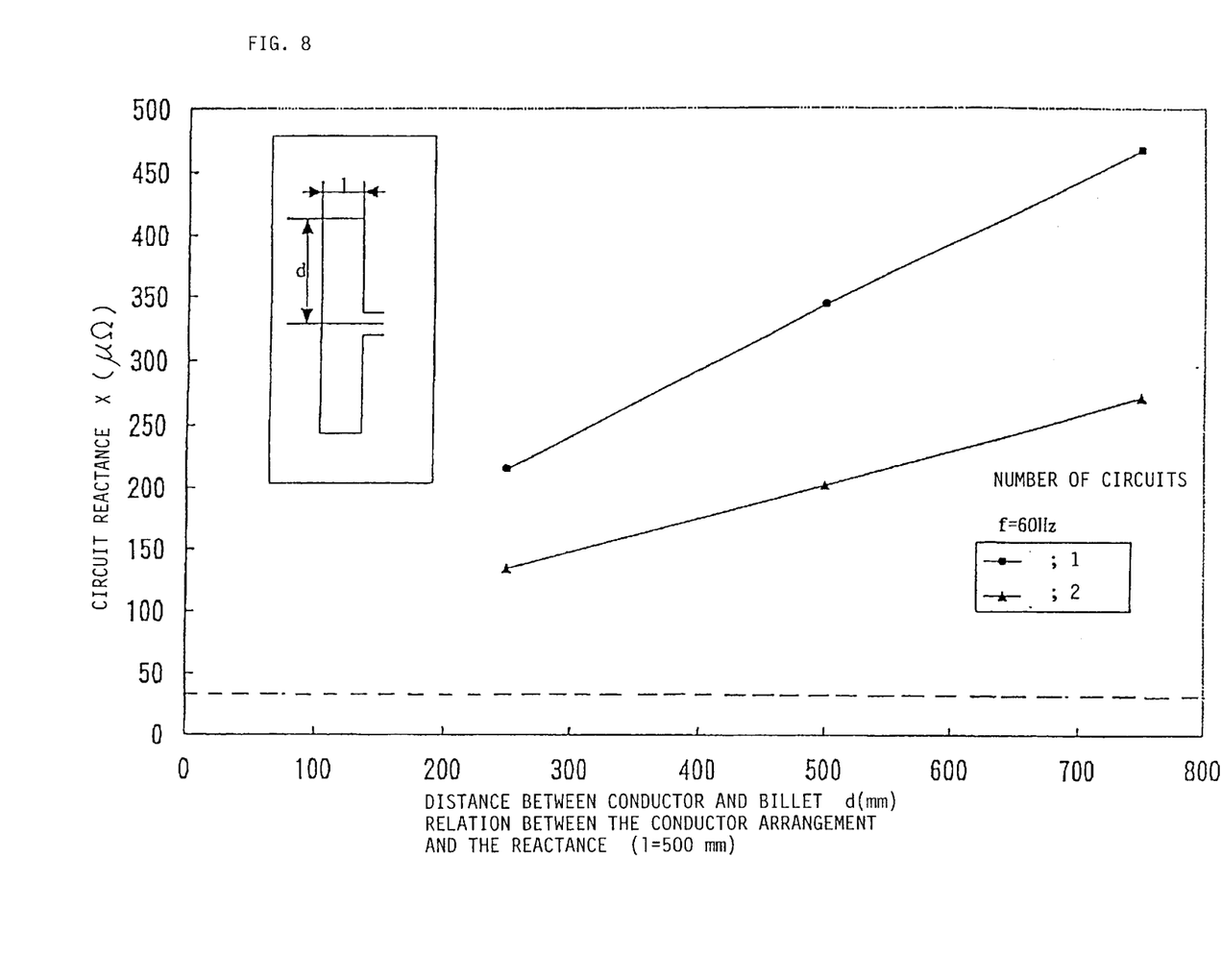
FIG. 8 shows characteristic curves in relation to the conductor arrangement and the reactance in the experimental models of FIG. 3 and FIG. 4, (1=500 mm).
Figure 9:
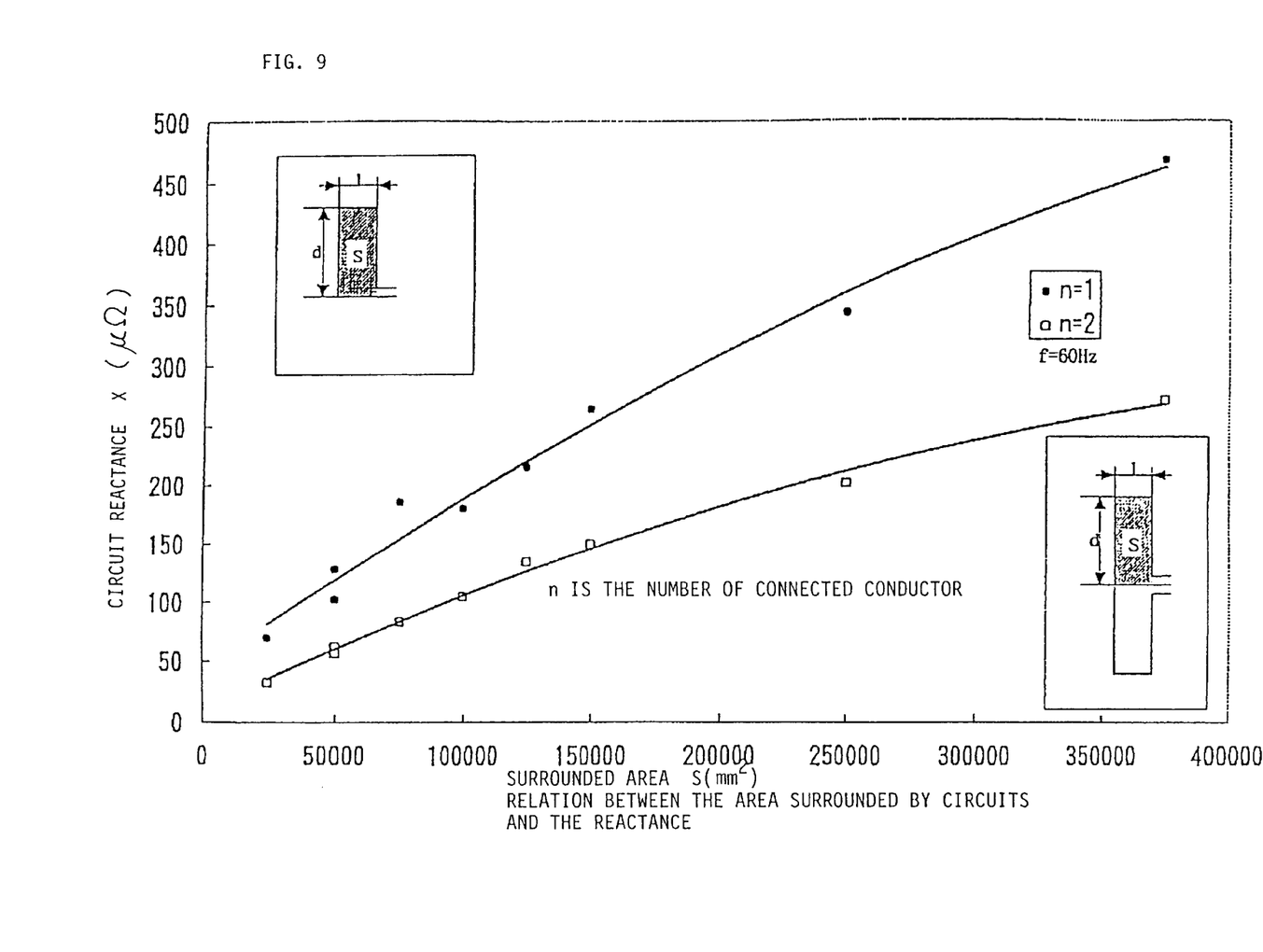
FIG. 9 shows characteristic curves in relation to the area surrounded by the conductor and the works to be welded in the experimental models of FIG. 3 and FIG. 4 and the reactance.
Figure 10:
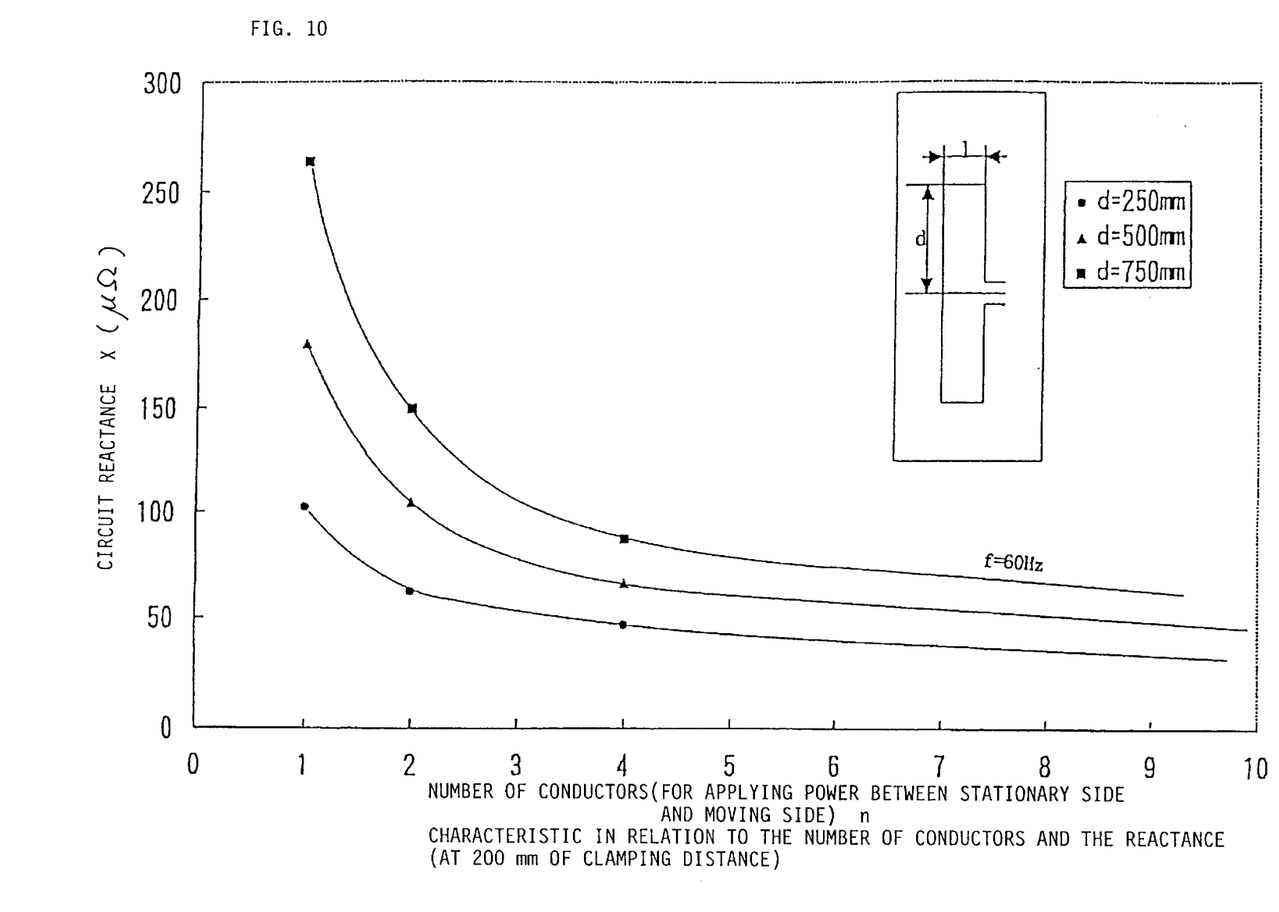
FIG. 10 shows characteristic curves in relation to the number of conductors and the circuit reactance.

FIGS. 3, 4, and 5 are perspective views of experimental models for power application to verify the usefulness of the modes carrying out the present invention. FIG. 3 is for the case of the number of circuits (the number of conductors) n is 1. FIG. 4 is for n is 2. FIG. 5 is for n is 4. FIGS. 6 through 8 show the characteristic curves obtained by measurement in these cases. That is, FIG. 6 shows characteristic curves in relation to the conductor arrangement in the experimental models of FIG. 3 and FIG. 4 and the reactance (l=100 mm). FIG. 7 shows characteristic curves in relation to the conductor arrangement in the experimental models of FIGS. 3, 4 and 5 and the reactance (l=200 mm). FIG. 8 shows characteristic curves in relation to the conductor arrangement in the experimental models of FIG. 3 and FIG. 4, and the reactance (I=500 mm). FIG. 9 shows characteristic curves in relation to the above-described area S and the circuit reactance. FIG. 10 shows characteristic curves in relation to the number of conductors and the circuit reactance.

The data obtained in FIGS. 6 through 10 verified the usefulness of the modes to carry out the present invention.

INDUSTRIAL APPLICABILITY

As described above, according to the present invention, the power source transformers are arranged at the stationary head side, a plurality of conductors connecting the transformers with corresponding electrodes are arranged at symmetrical positions surrounding the work to be welded, while half of the number of the conductors are connected to the electrodes at the moving head side, or the conductors are arranged to minimize an area surrounded by the conductors and the work, thus decreasing the impedance and decreasing the number of conductors necessary to connect to the electrodes of the moving head side. Thus, the structure of flash-butt welder can be simplified.

Therefore, the present invention can be utilized in the industry.

We claim:

1. A flash-butt welder having a stationary head and a moving head, a pair of electrodes arranged to each of the stationary and moving heads comprising:

at least two power transformers located at the stationary head side; and at least two conductors arranged symmetrically to a central line of works to be welded and connecting the power transformers with electrodes, while half of the number of the conductors connect the electrodes at the stationary head side with the electrodes at the moving head side.

2. The flash-butt welder of claim 1, wherein the conductors are arranged to minimize an area surrounded by the conductors and the works to be welded.

* * * * *